(12) United States Patent
Jung

(10) Patent No.: US 10,082,996 B2
(45) Date of Patent: Sep. 25, 2018

(54) FOLDABLE DISPLAY

(71) Applicant: Samsung Display Co., Ltd., Yongin-si, Gyeonggi-do (KR)

(72) Inventor: Sung Gon Jung, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/674,366

(22) Filed: Aug. 10, 2017

(65) Prior Publication Data

US 2017/0337029 A1 Nov. 23, 2017

Related U.S. Application Data

(63) Continuation of application No. 15/050,229, filed on Feb. 22, 2016, now Pat. No. 9,733,883.

(30) Foreign Application Priority Data

Feb. 24, 2015 (KR) ........................ 10-2015-0025947

(51) Int. Cl.
*G09G 5/00* (2006.01)
*G06F 3/14* (2006.01)
*G06F 3/147* (2006.01)

(52) U.S. Cl.
CPC ............ *G06F 3/1431* (2013.01); *G06F 3/147* (2013.01); *G06F 3/1446* (2013.01); *G09G 2300/023* (2013.01); *G09G 2300/026* (2013.01); *G09G 2356/00* (2013.01); *G09G 2380/02* (2013.01)

(58) Field of Classification Search
CPC ...... G06F 1/1446; G06F 3/1431; G06F 3/147; G06F 1/1601
USPC .............................................. 345/1.1, 8, 173
See application file for complete search history.

(56) References Cited

U.S. PATENT DOCUMENTS

| 8,723,824 | B2 | 5/2014 | Myers et al. |
| 8,736,162 | B2 | 5/2014 | Jin et al. |
| 9,164,547 | B1 | 10/2015 | Kwon et al. |
| 9,411,375 | B2 * | 8/2016 | Cohen .................... G06F 1/1601 |
| 9,733,883 | B2 * | 8/2017 | Jung ...................... G06F 3/1446 |
| 2010/0201604 | A1 * | 8/2010 | Kee ........................ G06F 1/1616 345/1.3 |

(Continued)

FOREIGN PATENT DOCUMENTS

KR 10-2010-0081161 A 7/2010
KR 10-2014-0001579 A 1/2014

(Continued)

*Primary Examiner* — Calvin C Ma
(74) *Attorney, Agent, or Firm* — Lewis Roca Rothgerber Christie LLP

(57) ABSTRACT

A foldable display is disclosed. In one aspect, the foldable display includes a first display unit located on a front surface of the foldable display, a second display unit located on a first side surface of the foldable display, and a third display unit located on a second side surface of the foldable display. The foldable display includes a first configuration in which the first to third display units are exposed and a second configuration in which the first display unit is folded and the second and third display units are exposed. The second and third display units are configured to form a fourth display unit inclined with respect to the folded first display unit in the second configuration of the foldable display.

9 Claims, 8 Drawing Sheets

(56) References Cited

U.S. PATENT DOCUMENTS

2013/0002133 A1* 1/2013 Jin ........................ G09F 9/33
                                                      313/511
2015/0022436 A1   1/2015  Cho et al.
2016/0181346 A1   6/2016  Kwon et al.

FOREIGN PATENT DOCUMENTS

| KR | 10-2014-0048739 A | 4/2014 |
|----|-------------------|--------|
| KR | 10-2014-0090921 A | 7/2014 |
| KR | 10-1452871 B1     | 10/2014 |

* cited by examiner

FOLDABLE DISPLAY

CROSS-REFERENCE TO RELATED APPLICATION

This application is a continuation of U.S. patent application No. Ser. 15/050,229, filed Feb. 22, 2016, which claims priority to and the benefit of Korean Patent Application No. 10-2015-0025947, filed on Feb. 24, 2015, the entire contents of both of which are hereby incorporated by reference.

BACKGROUND

Field

The described technology generally relates to a foldable display.

Description of the Related Technology

Display devices include various electronic components for displaying images. Example display devices include televisions, computer monitors, personal digital assistants (PDAs), and smart devices.

Certain display devices, such as organic light-emitting diode (OLED) displays, liquid crystal displays (LCDs), plasma display panels (PDPs), or electrophoretic displays (EPDs) can be manufactured to display high-definition images.

In recent years, foldable displays which can be arranged into various configurations for portability and various other uses have been developed. Users can use foldable displays more easily and more efficiently by adjusting the available surface area in a display region via folding or unfolding the foldable displays into different configurations.

SUMMARY OF CERTAIN INVENTIVE ASPECTS

One inventive aspect is a foldable display including a plurality of display units having an arrangement structure that effectively uses the available space of the foldable display.

Another aspect is a foldable display having a first configuration where the foldable display is unfolded and a second configuration that the foldable display is folded including: a first display unit located on a front surface of the foldable display; a second display unit located on one side surface of the foldable display and inclined at a first angle of inclination with respect to the first display unit; a third display unit located on another side surface of the foldable display and inclined at a second angle of inclination with respect to the first display unit. The first to third display units are exposed in the first configuration, the first display unit is folded in the second configuration and the second and third display units are exposed in the second configuration, and the exposed second and third display units can form a fourth display unit inclined with respect to the folded first display unit.

In some embodiments, the first angle of inclination can be smaller than the second angle of inclination.

In other embodiments, the second and third display units can be parallel to each other.

In still other embodiments, the sum of the first and second angles of inclination can be substantially 180°.

In even other embodiments, the fourth display unit can be inclined at the first or second angle of inclination with respect to the folded first display unit.

In yet other embodiments, the fourth display unit can include the second and third display units included in a same inclined surface.

In further embodiments, the first to third display units can constitute one flexible display.

In still further embodiments, the first display unit can correspond to a region covering the front surface of the flexible display, and the second and third display units can correspond to regions covering the both side surfaces of the flexible display.

In even further embodiments, the first to third display units can constitute one flexible display and a plurality of inflexible displays.

In yet further embodiments, the first display unit can be the flexible display located on the front surface of the flexible display, and the second display unit can be the inflexible display located on one side surface of the flexible display, and the third display unit can be the inflexible display located on another side surface of the flexible display.

In much further embodiments, the foldable display can further include a fifth display unit located on a back surface of the foldable display adjacent to the second or third display unit.

In still much further embodiments, the second and third display units, and the fifth display unit can be exposed outside in the second configuration.

In even much further embodiments, the foldable display can further include: a sensor unit sensing the first and second configurations of the foldable display; and a controller controlling the sensor unit, and the first to fourth display units.

In yet much further embodiments, the controller activates the first to third display units when the first configuration is detected by using the sensor unit, and the controller activates the fourth display unit by activating the second and third display units when the second configuration is detected.

In some embodiments, the fourth display unit can provide a notification about an incoming event.

In other embodiments, the fourth display unit can provide simple information about an incoming event received by the foldable display.

In still other embodiments, the fourth display unit can provide a lock release interface for unlocking the foldable display.

Another aspect is a foldable display comprising a first display unit located on a front surface of the foldable display; a second display unit located on a first side surface of the foldable display and inclined at a first angle with respect to the first display unit; and a third display unit located on a second side surface of the foldable display and inclined at a second angle with respect to the first display unit, wherein the foldable display is configured to be arranged in i) a first configuration in which the first to third display units are exposed and ii) a second configuration in which the first display unit is folded and the second and third display units are exposed, and wherein when the foldable display is in the second configuration, the second and third display units form a fourth display unit inclined with respect to the folded first display unit.

In exemplary embodiments, the first angle is less than the second angle. The second and third display units can be substantially parallel to each other. A sum of the first and second angles can be approximately 180°. The fourth display unit can be inclined at the first angle or the second angle with respect to the folded first display unit. The fourth display unit can comprise the second and third display units having the same inclined surface. The first to third display units can be formed as a single flexible display panel.

In exemplary embodiments, the first display unit corresponds to a region covering the front surface of the flexible display, and wherein the second and third display units respectively correspond to regions covering the first and second side surfaces of the flexible display. The first display unit can be formed as a flexible display panel and the second and third display units can be each formed of a rigid display panel. The foldable display can further comprise a fifth display unit located on a back surface of the foldable display adjacent to the second or third display unit. When the foldable display is in the second configuration, the second and third display units and the fifth display unit can be exposed.

In exemplary embodiments, the foldable display further comprises a sensor configured to detect the first and second configurations of the foldable display; and a controller configured to control the sensor and the first to fourth display units. The controller can be further configured to activate the first to third display units when the sensor detects that the foldable display is in the first configuration; and activate the fourth display unit when the sensor detects that the foldable display is in the second configuration. The fourth display unit can be configured to display a notification about an incoming event. The fourth display unit can be configured to display simple information about the incoming event received by the foldable display. The fourth display unit can be configured to provide a lock release interface for unlocking the foldable display.

BRIEF DESCRIPTION OF THE DRAWINGS

The accompanying drawings are included to provide a further understanding of the described technology and are incorporated in and constitute a part of this specification. The drawings illustrate exemplary embodiments of the described technology and, together with the description, serve to explain principles of the described technology.

DETAILED DESCRIPTION OF CERTAIN INVENTIVE EMBODIMENTS

The terms used in this specification are selected as a general terms that are widely used while considering the functions of the present specification. Also, in certain cases the meanings of terms is will be defined in the description of the corresponding embodiment. Accordingly, a term used herein shall be interpreted based on practical meanings and the contents throughout the specification instead of the simple label of the term.

Moreover, although exemplary embodiments are described in detail with reference to the accompanying drawings and contents described therein, the described technology is not limited or restricted by the exemplary embodiments.

Hereinafter, exemplary embodiments will be described in detail with reference to the accompanying drawings. Herein, a foldable display can include a first configuration in which the foldable display is unfolded and a second configuration in which foldable display is folded.

Figure 1A:
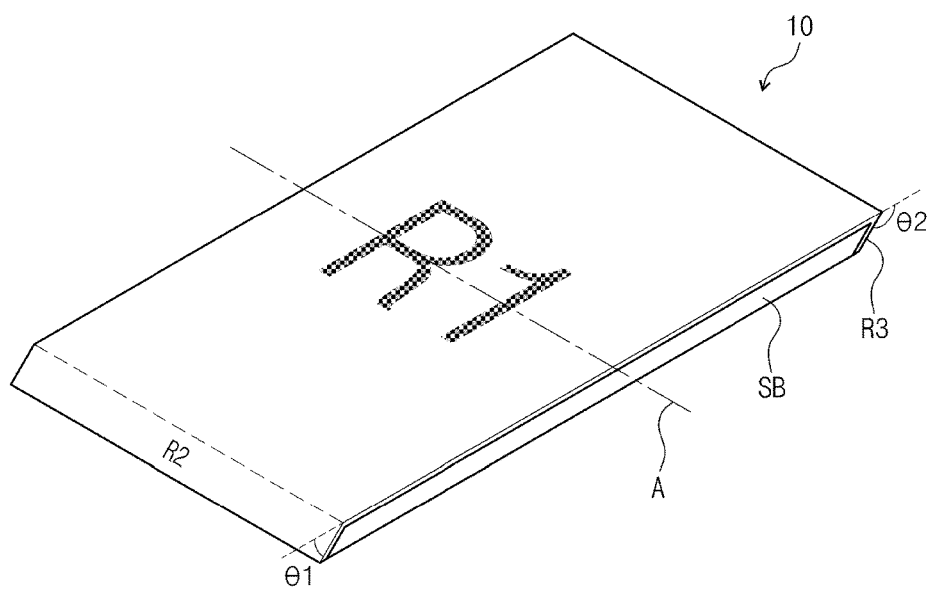
FIG. 1A is a front perspective view of a foldable display in a first configuration according to an embodiment.
Figure 1B:
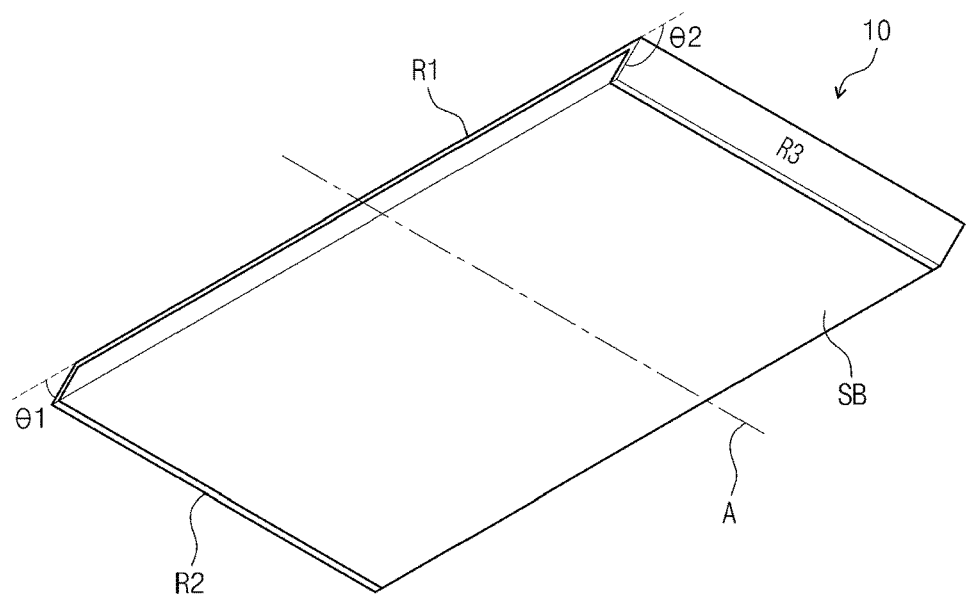
FIG. 1B is a rear perspective view of a foldable display in a first configuration according to an embodiment.
Figure 1C:
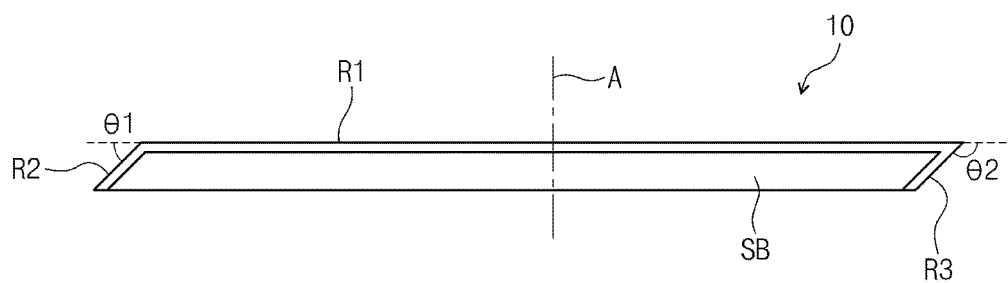
FIG. 1C is a side view of a foldable display in a first configuration according to an embodiment.

FIG. 1A is a front perspective view of a foldable display in the first configuration according to an embodiment. FIG. 1B is a rear perspective view of a foldable display in the first configuration according to an embodiment. FIG. 1C is a side view of a foldable display in the first configuration according to an embodiment.

Referring to FIG. 1A to 1C, the foldable display 10 includes a first display unit R1 located on a front surface of the foldable display 10, a second display unit R2 located on one side surface of the foldable display 10, and a third display unit R3 located on another side surface of the foldable display 10. The first to third display units R1 to R3 are formed on a substrate SB. The substrate SB can be flexible and/or rigid. In at least one embodiment, one portion of the substrate SB can be flexible and another portion of the substrate SB can be rigid.

The second display unit R2 can be inclined at a first angle of inclination θ1 with respect to the first display unit R1. In addition, the third display unit R3 can be inclined at a second angle of inclination θ2 with respect to the first display unit R1. The first angle of inclination θ1 can be different from the second angle of inclination θ2. For example, the first angle of inclination θ1 can be less than the second angle of inclination θ2.

The second and third display units R2 and R3 may be substantially parallel to each other. In some embodiments, the sum of the first angle of inclination θ1 formed by the first and second display units R1 and R2 and the second angle of inclination θ2 formed by the first and third display units R1 and R3 is substantially 180°. Accordingly, when the foldable display 10 is changed to the second configuration, the second and third display units R2 and R3 meet to form a fourth display unit R4 that is a new display region. A more detailed description of the fourth display unit R4 will be described below in relation to FIGS. 2A to 2C.

The first to third display units R1 to R3 can be formed of a single flexible display panel. A flexible display panel generally refers to a display panel manufactured on a flexible substrate that can be bent, folded or rolled without any loss in display characteristics. For example, a flexible display panel may be an organic light-emitting diode (OLED) display panel or an electrophoretic display (EPD) panel. In the flexible display panel of this embodiment, the first display unit R1 can be a region covering the front surface of the foldable display 10, the second display unit R2 can be a region covering a first side surface of the foldable display 10, and third display unit R3 can be a region covering a second side surface of the foldable display 10. The first and second side surfaces can be opposing side surfaces of the foldable display 10.

In another embodiment, the first to third display units R1 to R3 include a flexible display panel and a plurality of inflexible or rigid display panels. An inflexible display panel generally refers to a display panel manufactured on a solid substrate in contrast to the foregoing flexible display panel. For example, the inflexible display can be a liquid crystal display (LCD) panel, a plasma display panel (PDP), or an electrowetting display (EWD) panel.

The first display unit R1 can be a flexible display panel located on the front surface of the foldable display 10, the second display unit R2 can be an inflexible display located on a first side surface of the foldable display 10, and the third display unit R3 can be an inflexible display located on a second side surface of the foldable display 10. The first and second side surfaces may be both side surfaces of the foldable display apparatus 10, facing each other.

In addition, the first to third display units R1 to R3 can include at least one flexible display panel and/or at least one inflexible display; however, the described technology is not limited to the above-described embodiment.

Herein, the first configuration of the foldable display 10 refers to a configuration in which the foldable display 10 is unfolded. In the first configuration, the first to third display units R1 to R3 of the foldable display 10 can be exposed to environment. Therefore, a user may change the configuration of the foldable display 10 to the first configuration so as to use the first to third display units R1 to R3. However, since it can be difficult for a user to view the third display unit R3 due to the angle of the third display unit R3 in this configuration, the third display unit R3 can be selectively activated/deactivated in the first configuration depending on the embodiment.

Herein, the second configuration of the foldable display 10 refers to a configuration in which the foldable display 10 is folded. In this configuration, the second and third display units R2 and R3 of the foldable display 10 are exposed to the environment and the first display unit R1 is not exposed to the environment. Therefore, a user can change the position of the foldable display 10 to the second configuration so as to use only the second and third display units R2 to R3. In the second configuration, since it is difficult for a user to view the first display unit R1, the first display unit R1 can be deactivated and the second and third display units R2 and R3 can be activated.

Hereinafter, an embodiment of the foldable display 10 in the second configuration will be described in detail.

Figure 2A:
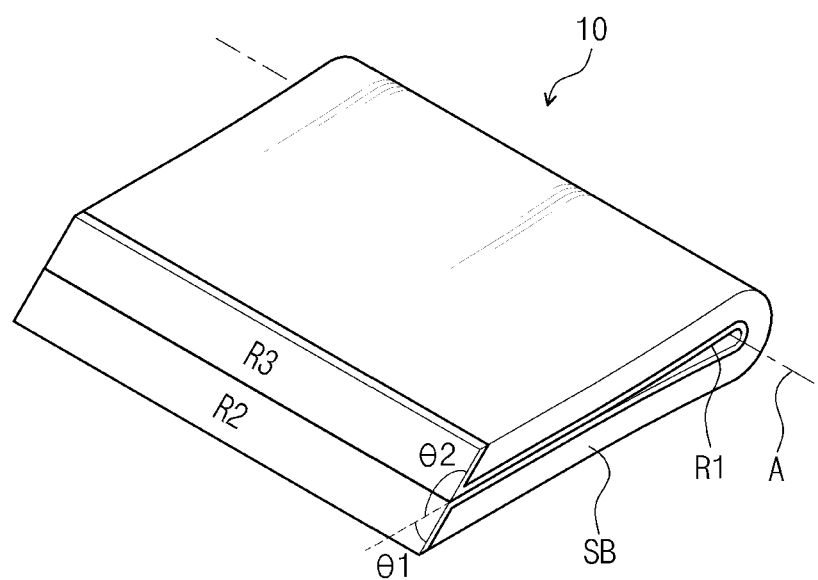
FIG. 2A is a front perspective view of a foldable display in a second configuration according to an embodiment.
Figure 2B:
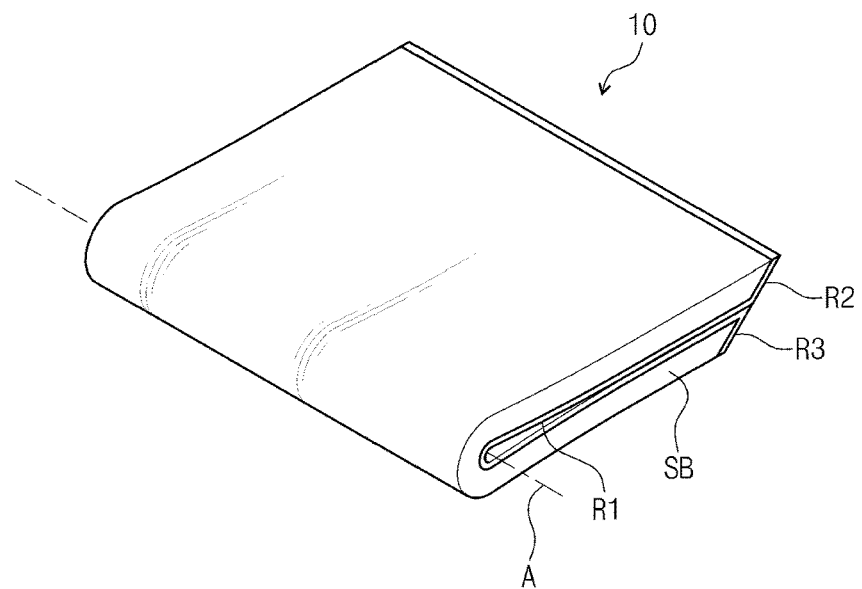
FIG. 2B is a rear perspective view of a foldable display in a second configuration according to an embodiment.
Figure 2C:
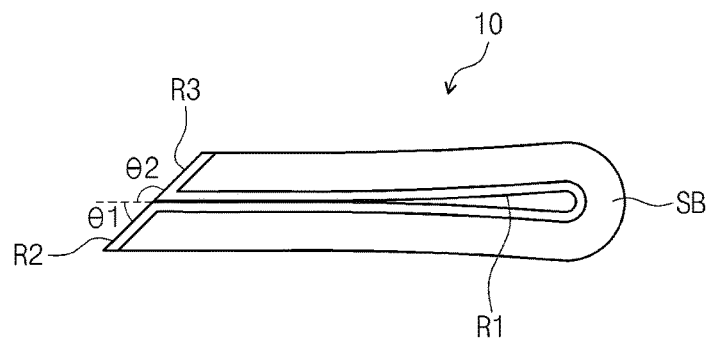
FIG. 2C is a side view of a foldable display in a second configuration according to an embodiment.

FIG. 2A is a front perspective view of a foldable display in the second configuration. FIG. 2B is a rear perspective view of a foldable display in the second configuration. FIG. 2C is a side view of a foldable display in the second configuration.

Referring to the embodiment of FIG. 2A to 2C, in the second configuration of the foldable display 10, the first display unit R1 is not exposed to the environment since the first display unit R1 is folded along a predetermined folding axis A, and the second and third display units R2 and R3 are exposed to the environment. In this configuration, the second and third display units R2 and R3 form a fourth display unit R4 inclined with respect to the folded first display unit R1.

More specifically, the second display unit R2 can form a first angle of inclination θ1 with respect to the first display unit R1 and the third display unit R3 can form a second angle of inclination θ2 with respect to the first display unit R1. When the foldable display 10 is changed to the second configuration and the second and third display units R2 and R3 are arranged to be substantially parallel to each other so that the sum of the first and second angles of inclination is substantially 180°, the second and third display units R2 and R3 can form a fourth display unit R4 which is a new display region. Since the second and third display units R2 and R3 are substantially parallel to each other, the second and third display units R2 and R3 have substantially the same inclined plane to be able to form a fourth display unit R4 in the second configuration of the foldable display 10. Accordingly, the fourth display unit R4 can form the first and/or second inclination θ1 or θ2 with respect to the folded first display unit R1.

In the standard foldable display, when a display unit is located on an inner side of the folded foldable display, users may be inconveniences since they are required to unfold the foldable display whenever the user wants to check simple information such as an incoming call, an incoming message, current time, current weather, or current temperature. In addition, when the standard foldable display is unfolded and all display units of the foldable display are activated, power consumption may be increased compared to at least one embodiment of the described technology.

When the display unit is located on the exterior of the folded foldable display, the display unit may be vulnerable to damage by even a small impact since the display unit is exposed to the environment.

However, in the foldable display 10 according to at least one embodiment, since the second and third display units R2 and R3 are formed on a side surface exposed to the environment in a folded configuration, users can view simple information even when the foldable display 10 remains folded. Accordingly, the foldable display 10 according to at least one embodiment can reduce power consumption and improve the speed and convenience of providing information. In addition, since the first display unit R1 that is a largest display unit is located inside the folded foldable display 10 when in the second configuration, the display unit can be prevented from being damaged by an external impact.

Since the second and third display units R2 and R3 operate as one display unit when interlocked or aligned with each other, the second and third display units R2 and R3 can function as the fourth display unit R4 that is a new display region.

Figure 3:
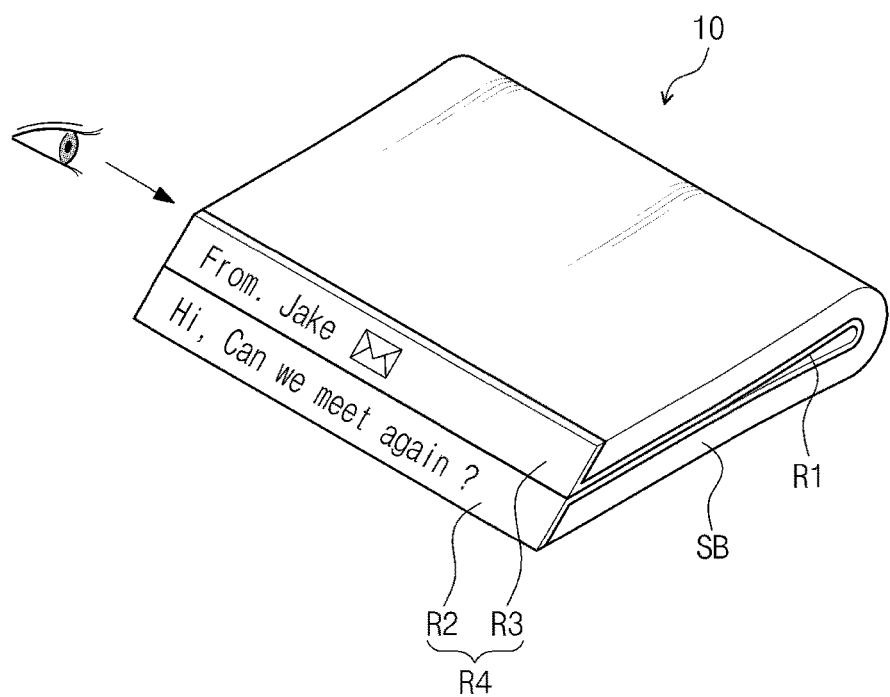
FIG. 3 is a view illustrating an embodiment of a foldable display with an activated fourth display unit.

FIG. 3 is a view illustrating an embodiment of a foldable display with an activated fourth display unit.

Referring to FIG. 3, the fourth display unit R4 can be activated in the second configuration as the second and third display units R2 and R3 forming the fourth display unit R4 are activated. The fourth display unit R4 can provide a variety of information to a user by using the second and third display units R2 and R3.

In one embodiment, the fourth display unit R4 can display information about an incoming event received by the foldable display 10. For example, the fourth display unit R4 can provide a notification about a received call, a received message, or the like. In addition, the fourth display unit R4 can display simple information regarding a received call, a received message, or the like. For example, the fourth display unit R4 can display simple information regarding the sender of a received call, the sender of a received message, a message's content, or the like.

In another embodiment, the fourth display unit R4 can display information about a current environmental condition of the foldable display 10. For example, the fourth display unit R4 can display simple information about a current surrounding environment such as the current time, current weather, current date, and/or current temperature.

In another embodiment, the fourth display unit R4 can provide a lock release interface for unlocking the foldable display 10. For example, the fourth display unit R4 can display various lock release interfaces for inputting a password, a fingerprint, etc. for unlocking the foldable display 10. A user can unlock and use the foldable display 10 by performing an unlock action set in the displayed lock release interface.

In consideration of the above-described embodiments, there is an effect in that the foldable display 10 according to at least one embodiment can be provided with information about an incoming event through the fourth display unit R4 quickly and conveniently even when a user does not unfold the foldable display 10.

Figure 4:
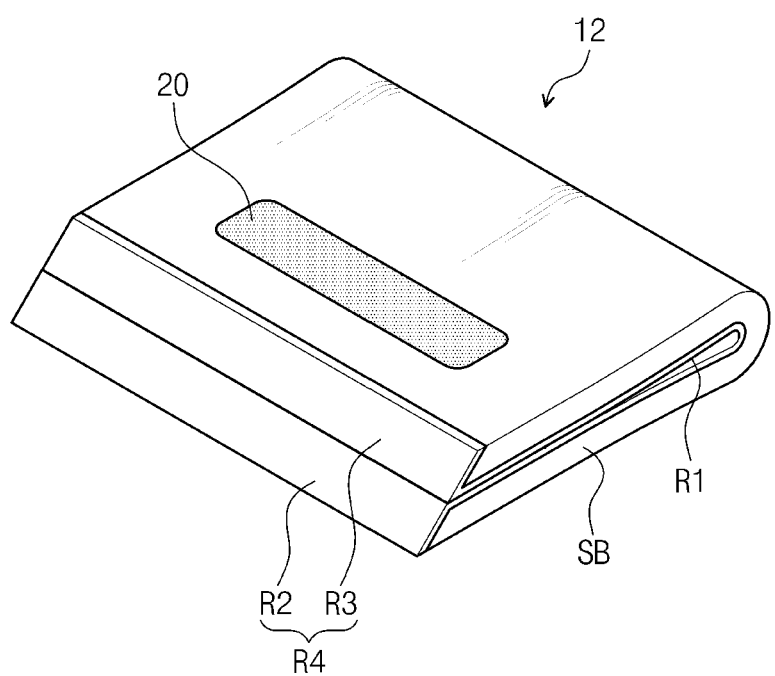
FIG. 4 is a view illustrating an embodiment of a foldable display with a lock release button.

FIG. 4 is a view illustrating an embodiment of a foldable display with a lock release button.

Referring to FIG. 4, a foldable display 12 can be separately provided with a lock release button 20 on a back surface thereof. The lock release button 20 can be a button for unlocking the foldable display 12. A user can unlock the foldable display 12 by touching or pressing the lock release button 20.

The lock release button 20 can be a mechanical button. A user can unlock the foldable display 12 by pressing the mechanical button. Alternatively, the lock release button 20 can be provided with a touch sensor. A user can unlock the foldable display 12 by touching the touch sensor.

The fourth display unit R4 can be activated when the foldable display 12 is unlocked.

Figure 5:
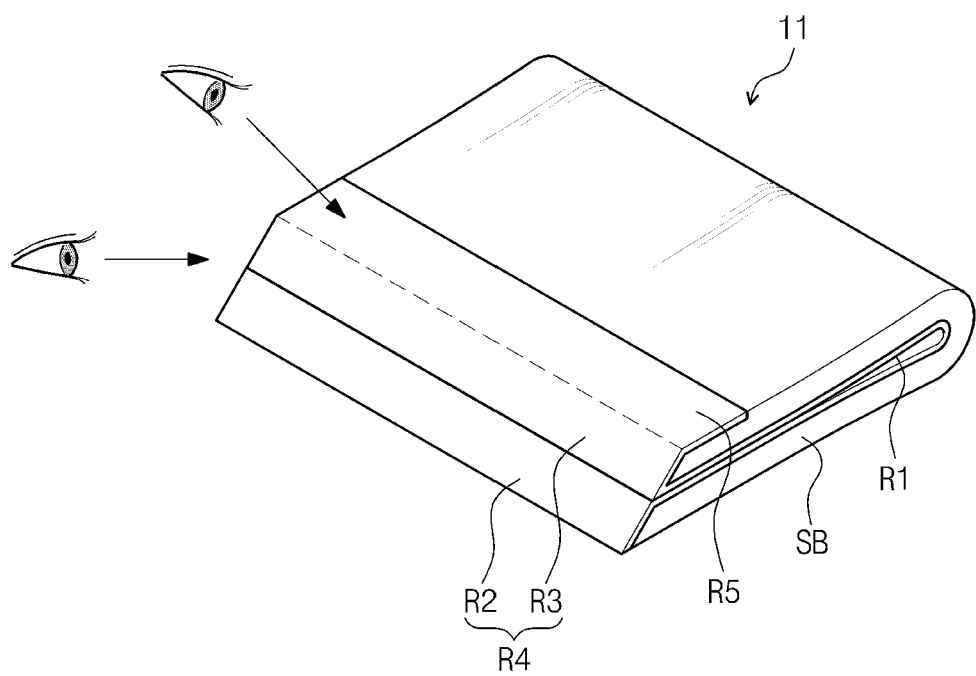
FIG. 5 is a view illustrating an embodiment of a foldable display including a fifth display unit.

FIG. 5 is a view illustrating an embodiment of a foldable display including a fifth display unit.

Referring to FIG. 5, a foldable display 11 can further include a fifth display unit R5 on a back surface thereof. The fifth display unit R5 can be located adjacent to the second or third display unit R2 or R3 on the back surface of the foldable display 11. Thus, in the second configuration of the foldable display 11, the second and third display units R2 and R3 and the fifth display unit R5 are exposed to the environment. In FIG. 5, one embodiment of the foldable display 11 including the fifth display unit R5 adjacent to the third display unit R3 is illustrated.

The fifth display unit R5 can provide a variety of simple information to a user together with the fourth display unit R4 or operating independently from the fourth display unit R4. The embodiment described above with reference to the FIG. 3 in relation to the information provided by the fifth display unit R5 can be applied to the present embodiment in the same or a similar manner.

The further provided fifth display unit R5 enables a user to view the display unit via a wider viewing angle to provide simple information from the foldable display 11.

Figure 6:
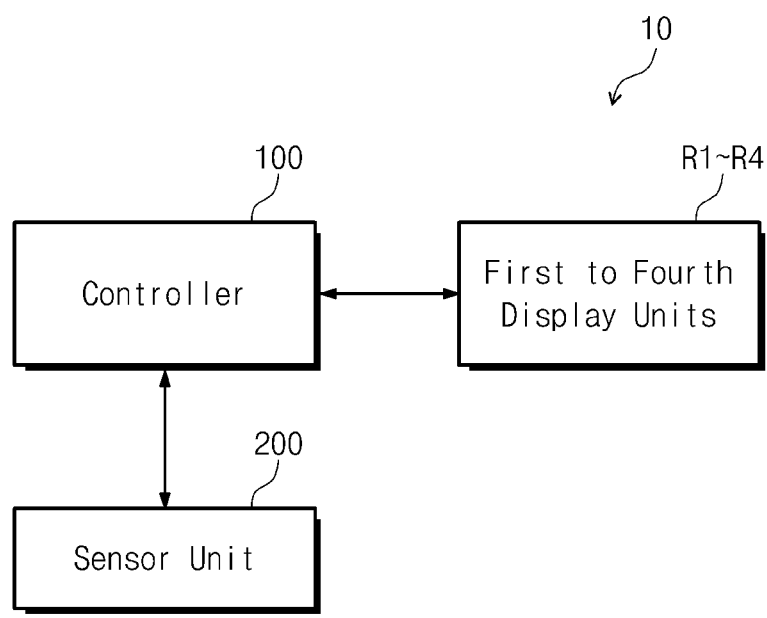
FIG. 6 is a block diagram of a foldable display according to an embodiment.

FIG. 6 is a block diagram of a foldable display according to an embodiment. Depending on embodiments, certain elements may be removed from or additional elements may be added to the foldable display 10 illustrated in FIG. 6. Furthermore, two or more elements may be combined into a single element, or a single element may be realized as multiple elements.

Referring to FIG. 6, the foldable display 10 can include a sensor unit or sensor 200, first to fourth display units R1 to R4, and a controller 100.

The sensor unit 200 can sense the configuration of the foldable display 10. In more detail, the sensor unit 200 can sense the first configuration in which the foldable display is unfolded and the second configuration in which the foldable display is folded.

The sensor unit 200 is provided with at least one sensing capability that can sense the configuration of the foldable display 10. For example, the sensor unit 200 can include one or more of: a touch sensor, an infrared sensor, an ultraviolet sensor, a gyro, a gyroscope sensor, a strain gauge sensor, a tilt sensor, an acceleration sensor, a depth sensor, a pressure sensor, a grip sensor, a camera sensor, a photo sensor, and a proximity sensor in order to sense a folded or an unfolded configuration of the foldable display 10.

The sensor unit 200 can transmit a sensed result to the controller and the controller having received the sensed result may detect a current configuration of the foldable display apparatus 10.

The first to fourth display units R1 to R4 can be activated in response to a configuration of the foldable display 10 to display images. Herein, the images may refer to a variety of visual information such as a still image or a moving picture visible by a user. For example, in the first configuration of the foldable display 10, the first to third display units R1 to R3 can be activated to display images. Alternatively, in the second configuration of the foldable display 10, the first display unit R1 can be deactivated and the second and third display units R2 and R3 can be activated to display images.

The size of the first display unit R1 can be greater than that of the second to fourth display units R2 to R4. Therefore, the first display unit R1 can display more diverse and more detailed information compared to the second to fourth display units R2 to R4. Therefore, when a user wants to use a larger screen, the user can use the first display unit R1 by converting the foldable display 10 to the first configuration. The second and fourth display units R2 and R4 can provide easy and simple information which can be provided to a user through a smaller screen. A more detailed description in this regard is as described above with respect to FIG. 3.

The controller 100 communicates with constituent units 100, 200, and R1 to R4 of the foldable display unit 10 and can control the constituent units 100, 200, and R1 to R4.

In one embodiment, the controller 100 can communicate with the sensor unit 200 to control the sensor unit 200. In particular, the controller 100 can receive a sensed result from the sensor unit 200 to detect the first and second configurations of the foldable display 10.

In another embodiment, the controller 100 can control the first to fourth display units R1 to R4. In particular, the controller 100 can control the activity of the first to fourth display units R1 to R4 in response to a configuration of the foldable display 10. The controller 100 can activate the first to third display units R1 to R3 when the first configuration of the foldable display 10 is detected by the sensor unit 200. The controller 100 can activate the second to third display units R2 to R3 to activate the fourth display unit R4 when the second configuration of the foldable display 10 is detected by the sensor unit 200. The controller 100 can recognize the second and third display units R2 and R3 as the fourth display unit R4 that is one display unit to control the fourth display unit R4 by controlling activity of the second and third display units R2 and R3. When the foldable display 10 further includes the fifth display unit R5, the controller 100 can also control the activity of the fifth display unit R5 in response to a configuration of the foldable display 10.

In addition, the controller 100 can control images displayed on the first to fourth display units R1 to R4. The controller 100 can control the first display unit R1 so as to display an image requiring a large screen such as a movie, TV, or an application execution screen. In addition, the controller 100 can control the second to fourth display units R2 to R4 so as to display images requiring small screens such as a lock release interface, the current time, a notification regarding an incoming event, and/or simple information. When the foldable display 10 further includes the fifth display unit R5, the controller 100 can also control a display image of the fifth display unit R5.

FIG. 6 is a block diagram according to an embodiment of foldable display 10. In FIG. 6, respective blocks are constituent units 100, 200, and R1 to R4 of the foldable display 10 and are separately illustrated to be logically discriminated. Therefore, the constituent units 100, 200, and R1 to R4 of the foldable display 10 described above can be mounted on a single chip or on a plurality of chips according to the design of the foldable display 10.

According to at least one embodiment, a foldable display can provide a variety of information to a user by using a plurality of display units formed on side surfaces thereof even when the foldable display is folded.

Although the respective drawings have been described individually for convenience of explanation, other foldable displays can be designed such that the embodiments illustrated in the respective drawings can be merged to create a new embodiment without departing from the teachings of the described technology. Further, the foldable display is not limited to the configurations and methods of the above-described embodiments, but all or some of the respective embodiments can be selectively combined and executed so that various modifications can be made within the scope of the described technology.

Although preferred embodiments of the inventive technology have been illustrated and described, the inventive technology is not limited to the above-mentioned embodiments and various modified embodiments may be available by those skilled in the art without the scope of the appended claims.

What is claimed is:

1. A display, comprising:
a first display unit located on a front surface of the display;
a second display unit located on a first side surface of the display and inclined at a first angle with respect to the first display unit; and
a third display unit located on a second side surface of the display and inclined at a second angle with respect to the first display unit,
wherein the display is configured to be moved from a second configuration in which the first display unit is folded and the first to third display units are exposed, to a first configuration in which the first display unit is unfolded and the first to third display units are exposed.

2. The display of claim 1, wherein the first angle is different from the second angle.

3. The display of claim 2, wherein the second and third display units are substantially parallel to each other.

4. The display of claim 3, wherein a sum of the first and second angles is approximately 180°.

5. The display of claim 1, wherein the second display unit and the third display unit display independent information from each other in the first configuration.

6. The display of claim 1, wherein the second display unit and the third display unit display dependent information from each other in the first configuration.

7. The display of claim 1, wherein the first to third display units are formed as a single flexible display panel.

8. The display of claim 1, wherein the first display unit is formed as a flexible display panel and wherein the second and third display units are each formed of a rigid display panel.

9. The display of claim 1, wherein the first to third display units are activated when the display is in the first configuration, and
wherein the second display unit and the third display unit are activated when the display is in the second configuration.

* * * * *